Figure 1:
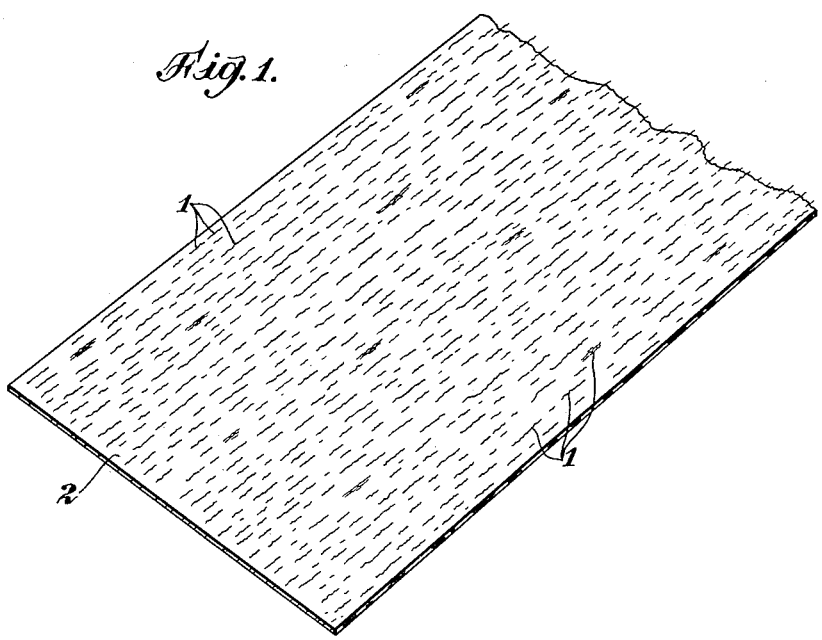

Sept. 1, 1936.  J. DRISCOLL  2,052,610

WEAR AND HEAT RESISTING COMPOSITION

Filed Sept. 23, 1932

INVENTOR
James Driscoll.
BY D. H. Halstead
ATTORNEY

Patented Sept. 1, 1936

2,052,610

UNITED STATES PATENT OFFICE 2,052,610

WEAR AND HEAT RESISTING COMPOSITION

James Driscoll, Plainfield, N. J., assignor to Johns-Manville Corporation, New York, N. Y., a corporation of New York Application September 23, 1932, Serial No. 634,549

4 Claims. (Cl. 106—22)

This invention relates to a wear and heat resisting composition comprising polymerized chloroprene and heat resistant fibers, particularly asbestos fibers, and to a method of making the same.

It is an object of the invention to provide a compact, impervious wear and heat resisting composition adapted for use as packing or friction material, the softening of which on exposure to moderately elevated temperatures is minimized by a compensating change occurring in the composition. A further object is to provide a composition in which a heat resistant, incompletely polymerized binder is intimately associated with and impregnated into interstices within or between reenforcing fibers and is then polymerized.

Figure 2:
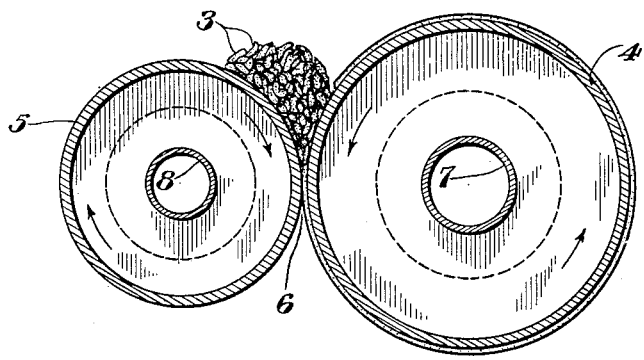

A preferred embodiment of the invention is illustrated in the drawing in which:

Fig. 1 shows a perspective view of a preferred product in the form of a sheet; and Fig. 2 shows a cross sectional view of a device for mixing and roughly shaping a composition, of preferred type, into a sheet.

In the figures like reference characters denote like parts.

The product contains fibers 1 that are heat resistant and consist suitably of rock wool or asbestos. The fibers are dispersed throughout the binder material 2. In the article illustrated, the dispersion is such that the average composition of the material is approximately the same from face to face or throughout.

A binder that has been found to give unique properties when in intimate association with dispersed chrysotile asbestos fibers, is incompletely polymerized chloro-2-butadiene-1,3, of the formula, $CH_2:CCl.CH:CH_2$, herein referred to as chloroprene, and made as described by Carothers and others in the Journal of the American Chemical Society, vol. 53, pages 4203-6, 1931. In the incompletely polymerized state in which it is initially used, the binder has a consistency approximating that of raw rubber.

The composition may comprise also filling materials, particularly pulverulent fillers, say of type used in rubber compounds, and particularly magnesium oxide.

The fibers and binding material, after being made into a plastic mixture 3, may be banked between the two rolls of the device illustrated in section in Fig. 2 and known as a sheeter. This device or machine consists of a roll 4, that is provided with steam heat admitted to the interior through the inlet 7 and a smaller roll 5 that is provided with cooling means, such as means for admitting cold water through the inlet 8 and circulating it within the roll. These rolls are equipped to be rotated in such manner as to force or draw the mixture 3 through the slit or orifice 6 between the two rolls. Also, there is equipment not shown in the figure, for spacing the two rolls at selected distances from each other and for increasing the spacing as the sheeting operation proceeds.

A method of making the improved composition of the present invention comprises making an intimate mixture of asbestos fibers or the like with chloroprene binder, shaping the mixture and subjecting the shaped mixture to a hardening operation such as maintaining it for some time at an elevated temperature to produce further polymerization and hardening of the binder. In order to obtain products of desired imperviousness, strength, compactness and wear resistance, it is desirable that the composition, before the said polymerization of the binder therein, should be subjected to a compressing and densifying operation to unite the binder and asbestos fibers and to force the binder within any interstices associated with the fibers. In this connection it should be understood that macroscopic asbestos fibers are unusual in consisting individually of sheaves of smaller elongated forms or crystals. In the commercial fibers, these sheaves may be partly opened in such manner that the chloroprene binder may be forced by pressure within openings between the individual elongated forms as well as between the composite fibers.

Pulverulent filler materials, if used, are incorporated before the shaping of the mixture. For convenience in manufacturing and/or to increase the pliability or yieldable character of the finished product, there may be used a softener or solvent for the chloroprene binder. Thus, there may be used a small amount of benzol or other volatile solvent for chloroprene, which solvent, after the mixture of the various materials is made sufficiently intimate, is removed by volatilization. Or, there may be used, either alone or in addition to a volatile solvent, a substantially non-volatile softener for the chloroprene. Thus, there may be used a small amount of so-called plasticizer, say approximately 4 to 8% of the weight of the chloroprene binder. The plasticizer should be a latent solvent or softener for the chloroprene and may comprise pine oil, dibutyl phthalate, or the like. In general, the proportion of plasticizer used may be less, the greater the activity of the plasticizer as a solvent or softening agent for the chloroprene.

The method of making the compositions of the present invention are illustrated in greater detail in the following specific examples which are each a modification of the general method.

*Example I*

Chloro-2-butadiene-1,3 is incompletely polymerized, say, as described in the said publication by Carothers and others. The product is treated with sufficient benzol to form a solution into which asbestos fibers may be mixed to form a thick plastic. The asbestos fibers, suitably in the proportion of 3 to 5 times the weight of the chloroprene, are then mixed in and the resulting mixture is shaped roughly into a sheet, the benzol is evaporated therefrom, and the sheet is subjected to strong compression and final shaping, say, between rolls in a rubber calendering machine. The shaped mass is then subjected to an elevated temperature, as, for example, to a temperature above 100° C., to polymerize further the chloroprene and develop the desired degree of hardness, wear resistance, and/or frictional characteristics.

*Example II*

A chloroprene mixture is made on conventional rubber mixing rolls or mill, from plasticized chloroprene and pulverulent filler materials such as the following:

| Material | Parts by weight |
| --- | --- |
| Plasticized chloroprene (type "A" duprene) | 22.1 |
| Magnesium oxide | 6.8 |
| Zinc oxide | 6.8 |
| Gas black pigment | 1.1 |
| Anti-oxidant (such as an acetaldol and alphanaphthylamine condensation product) | 0.2 |

The compound so made on the mill is then treated with sufficient benzol to give a thin cement, into which there are stirred 63 parts of moderately short "Canadian asbestos" (chrysotile) fibers. The product is a plastic mass. The plastic mass is then treated to remove the benzol, by volatilization, and shaped between the rollers of a rubber calendering machine. The shaped mass is then subjected to an elevated temperature to cause further polymerization of the chloroprene, as, for example, to a temperature of approximately 130 to 150° C., for approximately one-half hour. A sheet of $\frac{1}{16}$ inch thickness so made has been found to have a specific gravity of 2.0 and to be very useful as packing material.

In comparison with sheet packing made with rubber as a binder, the improved article has outstanding merit. For example, exposure of the rubber packing to contact with hot oil for 70 hours at 300° F. decreased the tensile strength of the packing, when measured at ordinary temperatures, by approximately 43%. In a comparable test, the tensile strength of the chloroprene composition was decreased less than 1%. In a more severe test, samples of the two types of article were exposed to hot oil for 70 hours at 500° F. This test so softened the rubber composition that it had practically no strength and was actually sticky, after being cooled to ordinary temperature for the purpose of testing. On the other hand, such severse treatment not only failed to decrease the strength of the chloroprene composition, but actually increased it by approximately 65%, presumably by increasing substantially the degree of polymerization of the chloroprene in such manner as to minimize the softening effect of the elevated temperature. Also, the chloroprene product that had been treated at 500° F. and then cooled for testing, was very much harder and stiffer than the original product but was still flexible.

*Example III*

A selected quantity of plasticized, incompletely polymerized chloro-2-butadiene-1,3 (chloroprene) is broken down on a rubber mill, the rolls of which are moderately warm, until plastic. A quantity of magnesium oxide equivalent to 10% of the weight of chloroprene is thoroughly milled into the batch, followed by other ingredients such as zinc oxide, carbon black, whiting and similar rubber compounding ingredients selected for desired effect on the finished product. When thoroughly mixed, the batch is sheeted out and placed in a rubber cement churn containing the required amount of benzol. The churn is operated until the batch is reduced to a thin cement. Asbestos fibers which have been well opened up are now blown slowly in the liquid cement and the mixture thoroughly worked until the fibers are completely coated and interstices impregnated with the cement compound. Due to absorption of the cement by the fibers, the mass becomes a plastic dough and in this form is banked between two horizontal steel rolls 4 and 5, Fig. 2, running at even surface speed. The roll 4 is heated to approximately 200° F. the surface of which, coming in contact with the fibrous cement dough, causes a rapid, local evaporation of the benzol solvent. As the excess of solvent is volatilized from the surface of the dough adjacent to the hot surface of the roll, the tackiness increases, causing strong adhesion of the coated fibers to the surface of the hot roll and forming a continuous film. Due to the slow separation of the two rolls at their tangent, to increase gradually the width of the orifice 6, the film formation is continuous and may be continued until a tough resilient sheet of predetermined thickness, say 1/64 to ⅜ inch is formed. This sheet or shaped mass is then cut from the hot roll on which it has been formed and polymerized by heat, preferably in a hydraulic press to establish the exact shape desired, after which it may be cut into strips or gaskets of required size for service.

The proportions and kind of ingredients used in making this product may be the same as described under Example II.

It is not necessary to the invention to explain the excellent results obtained. However, certain features are of interest.

During the sheeting operation described under Example III, in which the compound is drawn or forced through the orifice, in the form of a thin sheet, there is not only penetration of the binder, but also an orientation of the fibers into a predominantly parallel relationship. A substantial proportion of the fibers assume a position with their longest dimension more or less parallel to the direction of movement of the sheet through the orifice. This orientation causes the asbestos fibers to lie flatwise in the finished sheet and thus produces a product of less porous, more dense, and more resilient surface than would be the case if a large proportion of all the fibers terminated on the surface of the sheet.

It will be understood that the proportions of materials may be varied within wide limits to give specific compositions or properties that may be desired. Thus, a higher or lower proportion of the chloroprene may be used. Generally, a high proportion of the material favors impermeability and higher density of the product. Also, there may be used other materials that are conventional in the packing and frictional materials industry, including, for example, pigments of various types or colors and metal inserts or fillers.

The products of the present invention are useful as packing materials and also as friction materials, say, in automotive brake lining. When used as a sheet packing, the sheet may be coated with graphite on one or both faces.

Raw rubber may be compounded and intimately associated with the chloroprene, as on rubber mixing rolls and a vulcanizing agent for the rubber. This mixed compound is then substituted for chloroprene in one of the examples given above and mixed with fiber and finished as described.

The term "dispersed in" as used herein, includes the meaning "incorporated into". The term "polymerization" is used herein to designate changes, regardless of their exact nature, that are accompanied by hardening of the chloroprene. Comprehended within the invention are compositions in which a large proportion of fibers are cemented together by a relatively small proportion of binder, as well as compositions in which the fibers are largely isolated from each other by surrounding binder material.

The details that have been given are for the purpose of illustration and not restriction, and many variations therefrom may be made without departing from the spirit and scope of the invention.

What I claim is:

1. A friction material adapted for use as brake lining, packing and the like, comprising polymerized chloroprene and fibers of chrysotile asbestos dispersed in the chloroprene and bonded thereby into a unitary product.

2. A friction material adapted for use as brake lining, packing and the like, comprising an intimate mixture of polymerized chloroprene, rubber and reenforcing fibers distributed throughout the said mixture.

3. A friction material adapted for use as brake lining, packing and the like, comprising an intimate mixture of polymerized chloroprene, rubber and reenforcing fibers distributed throughout the said mixture, the fibers being chrysotile asbestos.

4. In making a friction material adapted for use as brake lining, packing and the like at elevated temperatures, the method which comprises forming an intimate mixture of chloroprene binder and fibers including chrysotile asbestos, shaping the mixture and subjecting the shaped material to an elevated temperature adapted to produce incomplete polymerization of the chloroprene and give an article adapted to be hardened by further polymerization during use of the article at an elevated temperature.

JAMES DRISCOLL.